United States Patent

Floroski et al.

[11] Patent Number: 5,145,105
[45] Date of Patent: Sep. 8, 1992

[54] DIFFUSION BONDING PROCESS

[75] Inventors: James M. Floroski, East Hartland; Eileen A. Bartley, Suffield, both of Conn.

[73] Assignee: United Technologies Corporation, Hartford, Conn.

[21] Appl. No.: 696,983

[22] Filed: May 2, 1991

Related U.S. Application Data

[63] Continuation of Ser. No. 436,299, Nov. 13, 1989, abandoned, which is a continuation of Ser. No. 839,237, Mar. 13, 1986, abandoned.

[51] Int. Cl.$^5$ .............................................. B23K 20/00
[52] U.S. Cl. .................................. 228/194; 228/263.13
[58] Field of Search ........... 228/193, 194, 135, 263.13, 228/263.14

[56] References Cited

U.S. PATENT DOCUMENTS 3,936,920  2/1976  Conn, Jr. .................. 228/193
4,350,528  9/1982  Engle ........................... 419/8

FOREIGN PATENT DOCUMENTS 0048468  4/1980  Japan ........................... 228/194

OTHER PUBLICATIONS

Tribaloy ® Intermetallic Alloy Compositions Cameron et al. (no date).

Primary Examiner—Kurt Rowan
Attorney, Agent, or Firm—William J. Sapone

[57] ABSTRACT

A diffusion bonding process provides a metallurgical bond between at least two metallic bodies having either iron or nickel as a component, utilizing a cobalt base alloy diffusion bondable to the metallic bodies at a temperature below the liquidus of either body but sufficient to promote interdiffusion of the cobalt alloy and metallic bodies. The bodies and alloy are contacted and subjected to the bonding temperature, whereupon solid state diffusion bonding occurs, producing a metallurgical bond which has a strength equivalent to brazing.

11 Claims, 2 Drawing Sheets

200X

DIFFUSION BONDING PROCESS

This is a continuation of application Ser. No. 07/436,299, filed Nov. 13, 1989, which was a continuation of application Ser. No. 07/839,237 filed Mar. 13, 1986, both now abandoned.

TECHNICAL FIELD

This invention relates to the diffusion bonding of metallic bodies having either iron or nickel as a component.

BACKGROUND ART

Diffusion bonding involves the molecular interdiffusion of alloy components between two contacted bodies resulting in a metallurgical bond. Generally, diffusion bonding is a solid state process which avoids substantial liquification of the contacted bodies during joining. Various methods exist which promote such interdiffusion. One method involves an intermediate bonding material mutually contacting the two articles to be joined. Such methods are disclosed in U.S. Pat. Nos. 3,632,319 to Hoppin, et al and 4,412,643 to Sato, et al. Bonding occurs without the application of external pressure and generally relies on the presence of a melting point depressant in the bonding material which provides a liquidus temperature less than the incipient melting temperatures of the contacted bodies. As the melting point depressant diffuses away from the bonding site, solidification occurs, joining the two bodies together. Another method utilizes hot isostatic pressing (HIP), which requires a combined application of temperature and pressure to promote solid state diffusion. Such a method is disclosed, for example, in U.S. Pat. No. 3,940,268 to Catlin, where rotor disks are bonded to a hub at temperatures of 1500°-2400° F. and pressures of 300 to 60,000 PSI.

While such diffusion bonding processes are generally applicable, there are several limitations. For a process relying on an intermediate bonding material, an additional step is required in the bonding process involving the application of either a coating or a powder to one or both of the bodies. Generally, the composition of the intermediate bonding powder must essentially match the components of the bodies to be bonded, limiting this process to joining bodies of similar composition. Utilizing a hot isostatic process can achieve a metallurgical bond without the use of an intermediate bonding material. However, this process generally requires very large and expensive equipment to provide the uniform temperatures and high pressures needed to achieve a metallurgical bond, with the size of the equipment increasing with the size of the bodies to be joined. Consequently, hot isostatic pressing is economically limited to bonding small bodies.

In U.S. Pat. No. 4,386,959 to Frehn, a method is disclosed for forming a connection between a sintered pressed powder metallurgy body and a metallic compact body. This method relies on the inclusion of at least one powder component in the powder metallurgy body which forms a liquid phase at the sintering temperature. Direct contact between the powder metallurgy body and the compact metallic body is required. While such a method is useful in certain applications, the presence of a liquid phase in a powder metallurgy body during sintering could significantly alter the final alloy properties. In particular, thermal resistance would be greatly reduced.

Alternatives to diffusion bonding include brazing and shrink fitting. These, in turn, have other processing limitations. While brazing can provide a metallurgical bond, the diffusion of undesirable components such as flux materials from the brazing composition into the adjoining bodies may weaken the surrounding alloys or cause grain boundary attack. Shrink fitting, which relies on tight physical contact to frictionally hold one body to another, does not provide a metallurgical bond and, therefore, is not as strong as either brazing or diffusion bonding. Consequently, shrink fitting is unacceptable in many applications.

DISCLOSURE OF THE INVENTION

It is an object of the present invention to provide a diffusion bonding process which bonds two metallic bodies without the application of external pressure, optimizing processing time and minimizing equipment requirements.

It is a further object of the present invention to achieve diffusion bonding without including a component in either body which forms a liquid phase at the bonding temperature.

It is another object of the present invention to provide a diffusion bonding process that joins bodies of dissimilar composition.

It is yet another object of the present invention to achieve a solid state diffusion bond between a powder metallurgy body and a metallic body during sintering.

These and other objects of the present invention are achieved by contacting at least two metallic bodies, each having either iron or nickel as a component, with a cobalt based alloy diffusion bondable at a temperature below the liquidus temperature of either body, and, subjecting the bodies and alloy to a temperature below the liquidus temperature of either body but sufficient to promote diffusion between the alloy and the bodies.

In the preferred embodiment, one body, comprising a powder metallurgy body, is diffusion bonded to a metallic body during final sintering. A cobalt base alloy comprising 7.5-9.5% by weight chromium, 27.0-30.0% molybdenum, 2.2-3.0% silicon, a maximum of 3.0% iron and nickel, with the balance cobalt, is blended with other powder metallurgical components, shaped, compacted to a final form and presintered. A second metallic body contacts the powder metallurgy body, with a controlled diametral interference fit of 0.0003-0.0064 cm between the bodies, with 0.0015-0.0041 cm preferred. The bodies are heated to the final sintering temperature, whereupon solid state diffusion occurs between the two bodies at the surface sites where the cobalt base alloy randomly occurs, providing a metallurgical bond having a strength equivalent to brazing.

BEST MODE FOR CARRYING OUT THE INVENTION

Figure 1:
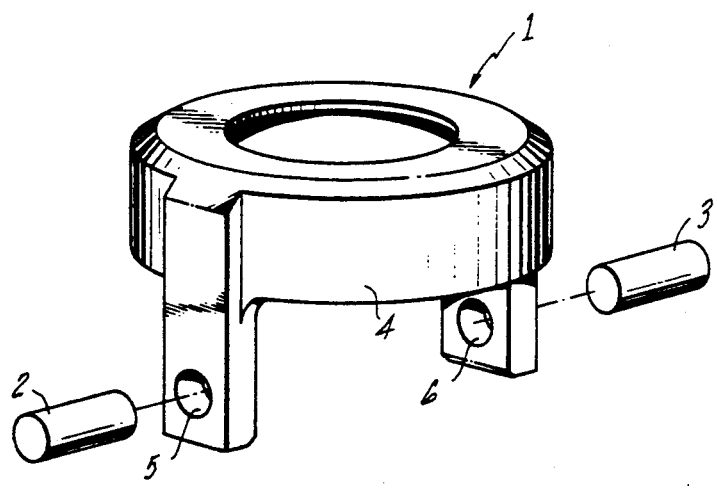
FIG. 1 is an isometric illustration of a typical powder metallurgy body which requires two metallic pins to be sinter diffusion bonded therein.

Referring to FIG. 1, a yoke bracket 1 and pins 2 and 3 are shown. For illustrative purposes, the diffusion bonding of a powder metallurgy 410 stainless steel yoke bracket to two forged Greek Ascoloy pins is discussed. Greek Ascoloy is a hardenable steel having a nominal composition of 0.17% by weight carbon, 13% chromium, 2% nickel, 3% tungsten, balance iron. While these shapes and compositions are exemplary, it will be understood by those skilled in the art that this invention is applicable to the diffusion bonding of any two metallic bodies having either iron or nickel as a component. For purposes of this disclosure, a metallic body may comprise a metal body, having either iron or nickel as a component, prepared by melting, powder, or any other metallurgical process.

Referring again to FIG. 1, a yoke bracket 1 having a cylindrical wall 4, is prepared according to accepted powder metallurgy processing steps, including, but not limited to, blending various metalurgic powders, forming to shape, compacting to a desired density and pre-sintering. For the illustrative yoke, 410 stainless steel powder is combined with a cobalt base alloy diffusion bondable to a metallic body at the sintering temperature of the powder metallurgy body. 1–15% by volume may be added, with about 10% preferred. While blending of the cobalt based alloy with other powder metallurgy components is exemplary of the invention, any means for providing the alloy at the bonding site may be used. For example, surface coating may be an appropriate alternative.

In the preferred embodiment, the cobalt base alloy comprises 7.5–9.5% by weight chromium, 27.0–30.0% molybdenum, 2.2–3.0 silicon, a maximum of 3.0% iron and nickel with the balance cobalt, which is commercially available from E. I. duPont de NeMours and Company (Dupont) as Tribaloy ® T-400 alloy. Tribaloy ® materials are known for increasing the wear and corrosion resistance of various alloys but not for diffusion bonding metallic bodies. While quantities up to 50% by volume of the cobalt based alloy will provide the bonding effect, above 15% the presence of the cobalt based alloy significantly modifies various substrate alloy characteristics such as surface hardness and thermal resistance. Such characteristic changes may be minimized by applying the alloy as a surface coating to one or both of the bodies rather than blending as a powder component. However, this requires an additional processing step.

After blending, the powder body is formed into a final shape, compacted to the proper density and presintered. Such presintering partially solidifies the powder metallurgy body and allows machining, coining or other operations to be performed. While presintering is incorporated in the preferred embodiment, it is not required to utilize the diffusion bonding process of the present invention. Two pinsetting passages, 5 and 6, are provided in yoke 1, such as by drilling, to accommodate the two Greek Ascoloy pins, 2 and 3. The passages are of sufficient diameter to provide a controlled diametral interference fit between the two bodies of 0.0003–0.0064 cm with 0.0015–0.0041 cm preferred. Precise interference fitting, involving either a slightly oversized pin or undersized passage, assures optimum bond strength when joining a powder metallurgy body to a metallic body by maximizing surface contact. However, over 0.0064 cm bond strength is reduced due to lamination at the interference surfaces. Under 0.0003 cm diffusion bonding is reduced due to incongruous contact between the interference surfaces. The pins are inserted into the passages and the assembly sintered at 1200° C. (2,100° F.) for about one hour.

Figure 2:
FIG. 2 is a micrograph illustrating the diffusion bond which occurs between a power metallurgy body and a metallic body according to the preferred embodiment of the present invention.

It has not yet been determined why metallurgical bonding occurs at the cobalt alloy particle sites. However, it is suspected that cobalt may diffuse out while iron or nickel may diffuse in, thereby forming a metallurgical bond. Therefore, similarity in composition between the two bodies is not required beyond the presence of some minimum quantity of iron or nickel in each body. Referring to FIG. 2, a micrograph illustrates the bonding achieved at the randomly occuring surface sites of the cobalt based alloy. The resultant diffusion bond has been tested and exhibits a strength equivalent to brazing without the potential for grain boundary attack, and is achieved without the application of external pressure, minimizing equipment and processing costs. With powder metallurgy bodies, bonding occurs during a normal sintering step, further reducing processing time by avoiding additional fabrication steps.

While this invention is discussed in relation to 410 stainless steel yoke brackets and Greek Ascoloy pins, it will be understood by those skilled in the art that modifications in terms of metallurgy, shape, or composition, can be made without varying from the present invention.

Having thus described the invention, what is claimed is:

1. A method for solid state diffusion bonding at least two metallic bodies of dissimilar composition comprising:

providing a metallic body having either iron or nickel as a component;

providing a powder metallurgy body composed of a mixture of metal powders including either iron or nickel as one of the metal powders, the mixture of powders being shaped compacted to final form and pre-sintered, the powder metallurgy body having a cobalt base alloy powder blended with the metal powders, the cobalt base alloy being of a composition which promotes solid state diffusion bonding at a temperature below the liquidus temperature of either body;

contacting the bodies with an interference fit; and, heating the contacted bodies to the sintering temperature of the powder metallurgy body wherein the powder metallurgy body is sintered and solid state diffusion bonding occurs between the bodies at the surface sites where the cobalt base alloy randomly occurs, bonding the bodies together.

2. The method of claim 1 wherein the alloy is provided as a coating to the surface of one of the bodies.

3. The method of claim 1 wherein at least one metallic body is a powder metallurgic body composed of a compacted mixture of powder metallurgical components.

4. The method of claim 3 wherein the bodies are heated to a temperature sufficient to sinter the powder metallurgy body.

5. The method the claim 3 wherein the cobalt-based alloy is blended with the other powder metallurgical components in the powder metallurgy body, the cobalt-based alloy randomly occurring at the bonding surface.

6. The method of claim 5 wherein the powder metallurgy body contacts a dissimilar metallic body with a controlled interference fit of 0.0003–0.0064 cm.

7. The method of claim 1 wherein the cobalt-based alloy comprises 7.5-9.5% by weight chromium, 27.0-30.0% molybdenum, 2.2-3.0% silicon, a maximum of 3.0% nickel and iron, balance cobalt.

8. The method of claim 5 wherein the cobalt-based alloy comprises 1-15% by volume of said powder metallurgy body.

9. A method for solid state diffusion bonding at least two metallic bodies of dissimilar composition comprising: providing a first metallic body having either iron or nickel as a component;

providing a second metallic body having either iron or nickel as a component;

coating at least one of the bodies with a cobalt base alloy having a composition which promotes solid state diffusion bonding at a temperature below the liquidus temperature of either body;

contacting the first and second bodies with an interference fit; and, heating the bodies to a temperature below the liquidus temperature of either body wherein solid state diffusion bonding occurs between the bodies through the cobalt base alloy, bonding the bodies together.

10. The method of claim 9 wherein said cobalt-based alloy comprises 7.5-9.5% by weight chromium, 27.0-30.0% molybdenum, 2.2-3.0% silicon, a maximum of 3.0% nickel and iron, balance cobalt.

11. The method of claim 9 wherein said cobalt-based alloy comprises 1-15% by volume of said powder metallurgy body.

* * * * *